United States Patent Office 2,914,563
Patented Nov. 24, 1959

2,914,563

THERAPEUTIC COMPOSITION

Robert E. Allen, Wyoming, and Frank P. Palopoli and Edward L. Schumann, Cincinnati, Ohio, and Marcus G. Van Campen, Jr., Berkeley, Calif., assignors to The Wm. S. Merrell Company No Drawing. Application August 6, 1957
Serial No. 676,479

3 Claims. (Cl. 260—570)

Our invention relates to new chemical compounds which may be regarded as derivatives of triphenylethylene. They are distinguished, in general, by their anti-estrogenic activity in the endocrine system, anti-inflammatory activity, and gonadotrophic activity and activity in decreasing blood cholesterol levels. Some of the compounds possess various combinations of these properties.

As estrogen antagonists, the compounds are useful in the treatment of hyperestrogenism and disorders related to this condition, e.g., endometriosis, Kleinfelter's syndrome, dysmenorrhea, menopausal dysfunction, functional bleeding and similar conditions. They are active both orally and parenterally and so can be administered by either route, though the oral route is preferred in most instances. Some of the compounds have a high degree of activity as estrogen antagonists and are also advantageously nonestrogenic. Some of the compounds with anti-estrogenic activity are also uterotrophic.

As anti-inflammatory agents, the compounds are useful in alleviating the symptoms of such collagen diseases as arthritis and rheumatism and in the topical treatment of inflammation. Some of the compounds possess the novel combination of anti-inflammatory and anti-estrogenic activities and are especially advantageous for this reason.

As blood cholesterol depressants, the compounds are useful in the treatment of atherosclerosis.

As gonadotrophic inhibition agents, the compounds are useful for the treatment of fertility and sterility problems and can be administered orally or parenterally for this purpose.

The compounds can be used orally and parenterally in doses ranging between 25 mg. and 2 to 4 grams daily, depending on the condition under treatment. For topical use, the compounds can be incorporated into creams, ointments or lotions in concentrations of up to 10 percent. In aerosol sprays, the concentration can be in the order of about 0.05 to 1 percent.

The compounds can be isolated and are generally useful in the form of their salts with mineral acids such as hydrochloric or hydrobromic acid or with organic acids such as citric, oxalic or the like. They can be used as the base, however.

The compounds of our invention are derivatives of triphenylethylenes in which one of the phenyl groups is substituted by a basic ether group of the formula described below and in which the mono-phenyl substituted carbon atom in the ethylene group is linked to halogen. The new compounds have the formula

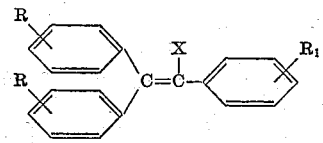

in which one of the groups represented by R is a basic ether group of the formula —$OC_nH_{2n}A$, wherein $n$ is 2, 3 or 4 and A is a dialkylamino group in which the alkyl group contains from 1 to 4 carbon atoms, or a cyclic structure such as a N-piperidyl or a N-morpholinyl group. The group —$OC_nH_{2n}A$ is attached to the benzene ring by the oxygen atom in the para position to the point of attachment of the benzene ring to the ethylene group. The benzene nucleus substituted with the —$OC_nH_{2n}A$ group must be attached to a carbon atom bearing a second benzene nucleus. The remaining R group and the $R_1$ group are hydrogen, halogen or methoxy and X is halogen.

The new haloethylenes can be generally prepared by halogenation of the corresponding ethylenes of the formula

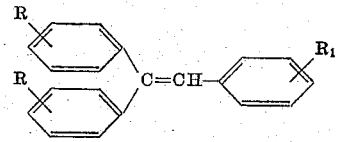

wherein and R and $R_1$ substituents have the same meaning described above. These ethylenes are described in our pending applications Serial No. 620,570, filed November 6, 1956, now abandoned and Serial No. 682,073, filed September 5, 1957.

The haloethylenes are prepared by the halogenation of the ethylenes using bromine, chlorine or N-chloro- or N-bromosuccinimide. They can also be prepared by halogenation of the hydrochloride or hydrobromide salt of the ethylenes with N-chloro- or N-bromosuccinimide, respectively. They can also be prepared by treatment of the corresponding ethanols with bromine.

The ethylene starting materials can be generally prepared by dehydration of the corresponding ethanols of the formula

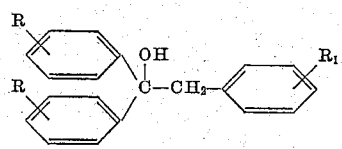

wherein the R and $R_1$ substituents have the same meaning as above. The dehydration is carried out by the use of mineral acids such as hydrochloric, hydrobromic and phosphoric acids. The ethanols are described in our pending applications Serial No. 599,343, filed July 23, 1956, now abandoned, and Serial No. 676,478, filed August 6, 1957.

Example 1

1-[p-(β-dimethylaminoethoxy)phenyl] - 1 - phenyl-2-p-anisylchloroethylene.—A mixture of 25 g. of the hydrochloride of 1 - [p - (β - dimethylaminoethoxy)phenyl]-1-phenyl-2-p-anisylethylene and 9.4 g. of N-chlorosuccinimide in 300 cc. dry chloroform was refluxed 18 hours. The solution was washed with an excess of 5 percent sodium hydroxide solution, dried over anhydrous potassium carbonate, and the solvent was replaced with butanone. A solution of 12 g. of citric acid in butanone was added and the dihydrogen citrate salt of 1-[p-(β-dimethylaminoethoxy)phenyl] - 1 - phenyl-2-p-anisylchloroethylene was obtained, melting at 100–102° C.

This compound exhibits estrogenic estrogen antagonist and anti-inflammatory activities and activity in decreasing blood cholesterol levels.

Example 2

1-[p-(β-dimethylaminoethoxy)phenyl] - 1 - phenyl-2-p-anisylbromoethylene.—To a solution of 50 g. of 1-[p-(β-dimethylaminoethoxy)phenyl] - 1 - phenyl-2-p-anisyletha-nol in 250 cc. glacial acetic acid was slowly added with stirring a solution of 40 g. of bromine in 250 cc. of acetic acid. After the mixture was stirred at room temperature for an hour, excess 10 percent sodium hydroxide was added and an ether extract was washed with water and dried. The ether was replaced with butanone and a solution of 32.6 g. of citric acid in ethanol was added. After repeated recrystallizations of the product from butanone, the dihydrogen citrate salt of 1-[p-($\beta$-dimethylaminoethoxy)phenyl]-1-phenyl-2-p - anisylbromoethylene was obtained, melting at 114–116° C.

This compound exhibits gonadotrophic inhibitory activity.

Example 3

*1-[p-($\beta$-diethylaminoethoxy)phenyl]-1,2-diphenylchloroethylene.*—A mixture of 20 g. of 1-[p-($\beta$-diethylaminoethoxy)phenyl]-1,2-diphenylethanol in 200 cc. of ethanol containing an excess of hydrogen chloride was refluxed 3 hours. The solvent and excess hydrogen chloride were removed under vacuum, and the residue was dissolved in a mixture of ethyl acetate and methylene chloride. 1-[p-($\beta$-diethylaminoethoxy)phenyl] - 1,2 - diphenylethylene hydrochloride was obtained, melting at 148–157° C. This hydrochloride salt was treated with N-chlorosuccinimide as in the procedure of Example 1. The product then obtained was converted to the free base and treated with citric acid. The dihydrogen citrate salt of 1-[p-($\beta$-diethylaminoethoxy)phenyl]-1,2 - diphenylchloroethylene was obtained, melting at 116.5–118° C.

The intermediate 1-[p-($\beta$-diethylaminoethoxy)phenyl]-1,2-diphenylethanol was obtained by treating 4-($\beta$-diethylaminoethoxy)benzophenone with benzylmagnesium chloride. It melted at 95–96° C.

This compound exhibits uterotrophic estrogen antagonist, gonadotrophic inhibitory and anti-inflammatory activities and activity in decreasing blood cholesterol levels.

Example 4

*1-[p-($\beta$ - diethylaminoethoxy)phenyl]-1,2-diphenylbromoethylene.*—The hydrochloride salt of 1-[p-($\beta$-diethylaminoethoxy)phenyl]-1,2-diphenylethylene (of Example 3) was converted to the free base. The hydrobromide salt was prepared and refluxed in chloroform with N-bromosuccinimide similar to the procedure of Example 1. The free base of the resulting product was treated with citric acid to give the dihydrogen citrate salt of 1-[p-($\beta$-diethylaminoethoxy)phenyl]-1,2-diphenylbromoethylene, melting at 125–127° C.

This compound exhibits weakly estrogenic estrogen antagonist, gonadotrophic inhibitory and anti-inflammatory activities and activity in decreasing blood cholesterol levels.

Example 5

*1-[p - ($\beta$ - diethylaminoethoxy)phenyl] - 1 - phenyl-2-p-anisylchloroethylene.*—Twenty grams of 1-[p-($\beta$-diethylaminoethoxy)phenyl]-1-phenyl-2-p-anisylethanol was dehydrated as in Example 3. The solvent was evaporated and the crude hydrochloride salt was dissolved in chloroform and treated with N-chlorosuccinimide as in Example 1. The free base was isolated, treated with 9.6 g. of citric acid and the dihydrogen citrate salt of 1-[p-($\beta$-diethylaminoethoxy)phenyl]-1-phenyl-2-p - anisylchloroethylene was obtained, melting with decomposition at 127° C.

This compound exhibits weakly esterogenic estrogen antagonist, gonadotrophic inhibitory and anti-inflammatory activities and activity in decreasing blood cholesterol levels.

Example 6

*1-[p-($\beta$-diethylaminoethoxy)phenyl]-1-phenyl-2-p-chlorophenylchloroethylene.*—To a solution of 20 g. of the hydrochloride salt of 1-[p-($\beta$-diethylaminoethoxy)phenyl]-1-phenyl-2-p-chlorophenylethylene in 200 cc. of dry chloroform was added slowly with stirring a solution of 4.3 g. of chlorine in 90 cc. of carbon tetrachloride over a period of an hour. The mixture was shaken with excess 10 percent sodium hydroxide solution and dried over anhydrous potassium carbonate. The solvent was removed and replaced with butanone, and a molecular equivalent of citric acid in butanone was added. The dihydrogen citrate salt of 1-[p-($\beta$-diethylaminoethoxy)-phenyl]-1-phenyl-2-p-chlorophenylchloroethylene was obtained, melting at 111–112° C.

This compound exhibits weakly estrogenic estrogen antagonist, gonadotrophic inhibitory and anti-inflammatory activities.

Example 7

*1-[p-($\beta$-diethylaminoethoxy)phenyl]-1-p-chlorophenyl-2-p-anisylchloroethylene.*—Twenty-one grams of 1-[p-($\beta$-diethylaminoethoxy)phenyl]-1-p-chlorophenyl-2-p-anisylethanol was dehydrated as in Example 3 and treated with 8.8 g. of N-chlorosuccinimide as in Example 5. The chloroform solution was washed repeatedly with water, dried over anhydrous magnesium sulfate and the solvent was replaced with ethyl acetate. The hydrochloride salt of 1 - [p-($\beta$-diethylaminoethoxy)phenyl]-1-p-chlorophenyl - 2 - p - anisylchloroethylene was obtained, melting at 185° C.

This compound exhibits uterotrophic estrogen antagonist, gonadotrophic inhibitory and anti-inflammatory activities.

Example 8

*1-[p-($\beta$-dibutylaminoethoxy)phenyl]-1-phenyl - 2-p-anisylchloroethylene.*—Following the procedure of Example 7, using 14 g. of 1-[p-($\beta$-dibutylaminoethoxy)phenyl]-1-phenyl-2-p-anisylethanol, there was obtained the hydrochloride salt of 1-[-p-($\beta$-dibutylaminoethoxy)phenyl]-1-phenyl-2-p-anisylchloroethylene, melting at 149–153° C.

This compound exhibits uterotrophic estrogen antagonist, gonadotrophic inhibitory and anti-inflammatory activities.

Example 9

*1-[p-($\gamma$-diethylaminopropoxy)phenyl] - 1,2 - diphenylchloroethylene.*—A mixture of 113 g. of the sodium salt of 4-hydroxybenzophenone and an excess of $\gamma$-diethylaminopropyl chloride in 300 ml. of dry toluene was refluxed 20 hours, the mixture was washed with 10 percent sodium hydroxide solution, then water and distilled. 4-($\gamma$-diethylaminopropoxy)benzophenone was obtained, boiling at 220° C. at 0.6 mm., $n_D^{25}$=1.5680. A solution of 80 g. of this ketone in 200 ml. of dry benzene was treated with 600 ml. of an ethereal solution containing 0.33 mole of benzylmagnesium chloride. After decomposing the mixture with ammonium chloride solution, the dihydrogen citrate salt was formed of the product, 1-[p-($\gamma$-diethylaminopropoxy)phenyl]-1,2 - diphenylethanol, melting at 121° C. This ethanol, converted to the free base by treatment with 10 percent sodium hydroxide solution, was dehydrated and chlorinated according to the procedure of Example 7 to give the hydrochloride salt of 1-[p-($\gamma$-diethylaminopropoxy)phenyl]-1,2-diphenylchloroethylene, melting at 110–112° C.

Example 10

*1-[p-($\beta$-piperidinoethoxy)phenyl]-1-phenyl-2 - p-anisylchloroethylene.*—Following the procedure of Example 7, using 26 g. of 1-[p-($\beta$-piperidinoethoxy)phenyl]-1-phenyl-2-p-anisylethanol, there was obtained 1-[p-($\beta$-piperidinoethoxy)phenyl]-1-phenyl-2-p-anisylchloroethylene hydrochloride, melting at 186–187° C.

This compound exhibits weakly estrogenic estrogen antagonist, gonadotrophic inhibitory and anti-inflammatory activities.

Example 11

*1-[p-($\beta$-morpholinoethoxy)phenyl]-1,2-diphenylchloroethylene.*—When 1-[p-($\beta$-morpholinoethoxy)phenyl]-1,2-diphenylethylene hydrochloride was treated with an equivalent of N-chlorosuccinimide in chloroform, 1-[p-($\beta$-morpholinoethoxy)phenyl] - 1,2 - diphenylchloroethylene was obtained, whose hydrochloride salt melted at 203° C.

The 1-[p-(β-morpholinoethoxy)phenyl]-1,2-diphenylethylene was obtained as follows:

4-(β-morpholinoethoxy)benzophenone was prepared by refluxing 16 hours a mixture of 100 g. of 4-hydroxybenzophenone and 29 g. of sodium methoxide in 400 ml. of ethanol with a solution of N-β-chloroethylmorpholine (prepared from 100 g. of the hydrochloride salt) in 200 ml. of benzene. The solvents and precipitated sodium chloride were removed, the residue was taken up in ether, washed with 10 percent sodium hydroxide, then water and dried over magnesium sulfate. While removing ether, the 4-(β-morpholinoethoxy)benzophenone separated, giving 121 g., melting at 83–84° C.

*Analysis.*—Calcd. for $C_{19}H_{21}NO_3$: C, 73.28; H, 6.80; N, 4.50. Found: C, 73.03; H, 7.19; N, 4.76.

The Grignard of 26 g. of benzyl chloride in 250 ml. of dry ether was added to 51 g. of 4-(β-morpholinoethoxy)-benzophenone in 100 ml. of dry benzene, and after an hour of stirring was decomposed with 10 percent ammonium chloride solution. The organic layer was dried over anhydrous magnesium sulfate, the solvent was replaced with ether whereupon 1-[p-(β-morpholinoethoxy)phenyl]-1,2-diphenylethanol separated, melting at 113–114° C.

*Analysis.*—Calcd. for $C_{26}H_{29}NO_3$: C, 77.40; H, 7.25; N, 3.47. Found: C, 77.11; H, 7.28; N, 3.67.

A solution of 31 g. of 1-[p-(β-morpholinoethoxy)-phenyl]-1,2-diphenylethanol in 200 ml. of alcohol containing an excess of anhydrous hydrogen chloride was refluxed for an hour. The solvent and excess hydrogen chloride were removed under vacuum and the residue was dissolved in hot ethyl acetate containing a little methanol. Crystals of the hydrochloride salt of 1-[p-(β-morpholinoethoxy)phenyl]-1,2-diphenylethylene were obtained which melted at 151–181° C.

*Analysis.*—Calcd. for $C_{26}H_{27}NO_2$—HCl: C, 74.00; H, 6.69; N, 3.32. Found: C, 73.92; H, 6.50; N, 3.31.

All of the compounds of the above examples exhibited the activities described for each when administered parenterally (subcutaneously). Also, the compound of Example 3 exhibited anti-inflammatory activity when administered orally.

The following examples illustrate suitable pharmaceutical compositions containing the new compounds. In these examples, the quantities are given for single units, it being understood that in actual practice, the dosage forms will be prepared in suitable quantities, and the amounts of the materials adjusted accordingly.

Example 12

*25 mg. tablets.*—Twenty-five mg. of the citrate of 1-[p-(β-diethylaminoethoxy)phenyl]-1-p-phenyl-2-p-anisylchloroethylene (Example 5), 48 mg. of powdered sugar, and 32 mg. of corn starch are mixed and granulated with 10 percent gelatin solution. The granulation is dried and ground to fine granules for tableting. About 1 percent magnesium stearate is added as a lubricant, together with sufficient corn starch to give a weight of 2.5 grains per tablet. The product is compressed on a single punch or rotary machine using a 9/32 inch punch.

Example 13

*500 mg. tablets.*—Five hundred mg. of the citrate of 1-[p-(β-diethylaminoethoxy)phenyl]-1-phenyl-2-(p-chlorophenyl)chloroethylene (Example 6) in finely powdered form is admixed with 60 mg. of corn starch and 100 mg. of powdered sugar and then granulated with 10 percent gelatin solution. The granulation is dried and ground to size suitable for tableting. About 1 percent magnesium stearate is added as a lubricant, together with sufficient corn starch to give a weight of 700 mg. per tablet. The product is compressed on a single punch or rotary machine using a 7/16 inch punch.

The tablets of Example 12 and Example 13 may be suitably coated if desired, as, for example, with sugar.

Example 14

*Capsule.*—Twenty-five mg. of the citrate of 1-[p-(β-diethylaminoethoxy)phenyl] - 1 - phenyl - 2 - p - anisylchloroethylene (Example 5) is admixed with corn starch in quantity required to provide sufficient bulk for the desired size capsule, and the mixture is encapsulated.

Example 15

*Capsule.*—Five hundred mg. of the citrate of 1-[p-(β-diethylaminoethoxy)phenyl] - 1 - phenyl - 2 - (p - chlorophenyl) chloroethylene (Example 6) is admixed with sufficient corn starch to give the proper bulk for the desired size capsule, and the mixture is encapsulated.

Example 16

*Injectable suspension, 100 mg. per ml.*—The following ingredients are sterilized separately: 100 mg. of the hydrochloride of 1-[p-(β-di-n-butylaminoethoxy)phenyl]-1-phenyl-2-p-anisylchloroethylene (Example 8), 0.1 mg. of Tween 80 and q.s. corn oil to make a final volume of one ml. These ingredients are admixed aseptically. Particle size may be achieved by use of micronized material or by use of a ball mill, maintaining aseptic conditions. The above suspension may be administered subcutaneously and intramuscularly.

Example 17

*Oral suspension, 700 mg. per 15 ml.*—One hundred fifty mg. of magnesium aluminum silicate are hydrated in about 9 ml. of water; 500 mg. of sorbitan monooleate, 700 mg. of the citrate of 1-[p-(β-diethylaminoethoxy)-phenyl] - 1 - phenyl - 2 - anisylchloroethylene (Example 5), color and flavor, as desired, and water q.s. 15 ml. are added; the product is mixed well and homogenized.

Example 18

*Liquid (syrup) 25 mg. per teaspoon.*—Twenty-five mg. of the citrate of 1-[p-(β-diethylaminoethoxy)phenyl]-1-phenyl-2-anisylchloroethylene (Example 5) is dissolved in one ml. of water. Five mg. of sodium benzoate, 3.5 ml. of liquid sugar, 5 mg. of citric acid, and 0.375 mg. of butoben are added and stirred until dissolved, using gentle heat if necessary. Flavor, as desired, and water q.s. are then added.

Example 19

*Liquid (syrup) 500 mg. per tablespoon.*—Five hundred mg. of the citrate of 1-[p-(β-diethylaminoethoxy)-phenyl] - 1 - phenyl - 2 - p - anisylchloroethylene (Example 5) and 4.5 mg. of sugar are dissolved in sufficient water so that after the addition of 2.25 ml. of alcohol USP and flavor, as desired, the volume is 15 ml.

Example 20

*Injectable solution, 2 mg. per ml.*—Two mg. of the hydrochloride of 1 - [p - (β - di - n - butylaminoethoxy)-phenyl]-1-phenyl-2-p-anisylchloroethylene (Example 8) and water for injection q.s. one ml. are mixed and warmed gently till solution is accomplished. The solution is filtered through an 03 porosity Selas filter, using sterilized equipment under aseptic conditions, and is used freshly made-up for injection.

The other compounds of Examples 1 to 11 can also be used to prepare pharmaceutical preparations such as those of Examples 12 to 20.

This application is a continuation-in-part of our copending application Serial No. 620,570, filed November 6, 1956, and now abandoned.

We claim:
1. Compounds of the formula

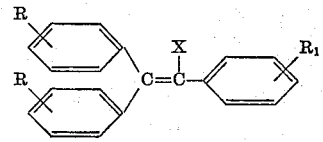

wherein only one of the groups represented by R is a group of the formula —$OC_nH_{2n}A$, attached by the oxygen atom to the benzene ring in para position to the point of attachment of the benzene ring to the carbon atom of the straight chain group, wherein $n$ is an integer of 2 to 4 and A is selected from the group consisting of dialkylamino in which the alkyl group contains from 1 to 4 carbon atoms, N-piperidyl and N-morpholinyl groups, wherein the remaining group represented by R and the $R_1$ group are selected from the group consisting of hydrogen, halogen and methoxy, and X is halogen.

2. 1 - [p - ($\beta$ - diethylaminoethoxy)phenyl] - 1,2 - diphenylchloroethylene.

3. 1 - [p - ($\beta$ - diethylaminoethoxy)phenyl] - 1-phenyl-2-p-anisylchloroethylene.

References Cited in the file of this patent

UNITED STATES PATENTS 2,703,324     Binkley et al. _____ Mar. 1, 1955